Patented Oct. 18, 1949

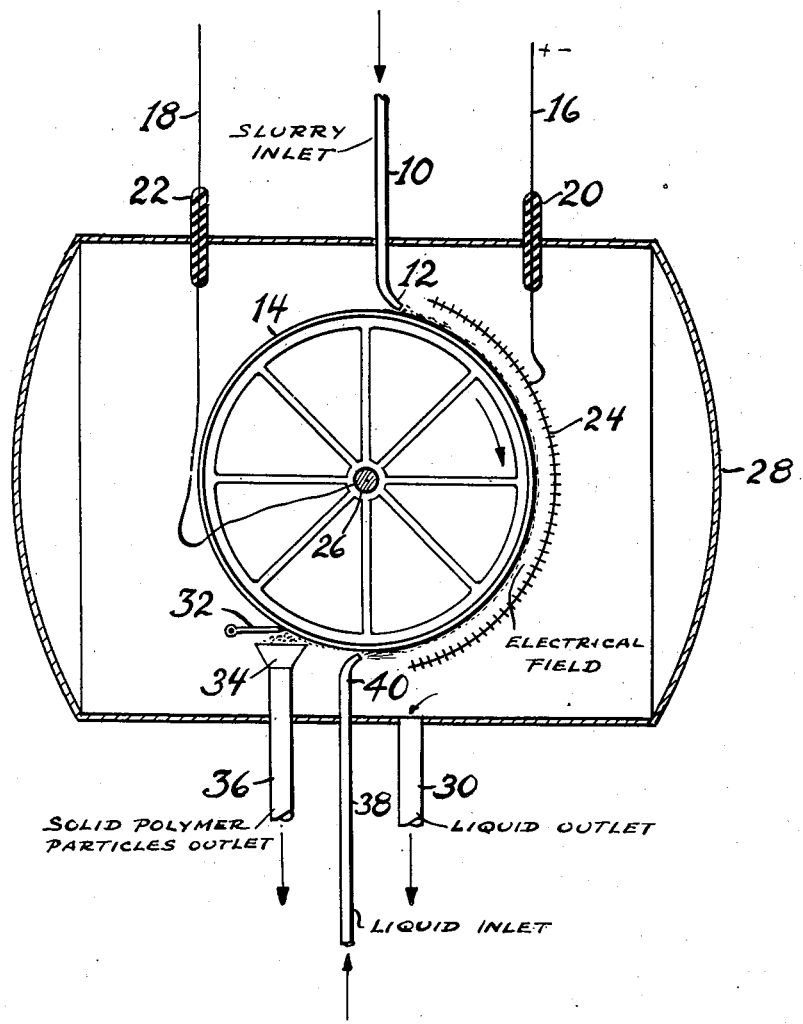

2,485,335

UNITED STATES PATENT OFFICE 2,485,335

POLYMER SEPARATION

Charles W. Tyson, Summit, N. J., assignor to Standard Oil Development Company, a corporation of Delaware Application December 30, 1944, Serial No. 570,752

1 Claim. (Cl. 204—180)

This invention relates to polymerization processes and particularly to processes for the polymerization of isoolefins or mixture of isoolefins with copolymerizable materials at low temperatures and in the presence of Friedel-Crafts type catalysts.

High molecular weight polymers have been prepared by polymerizing isoolefins such as isobutylene and mixtures of isobutylene with diolefins such as butadiene or isoprene or with vinyl benzenes such as styrene at temperatures below $-10°$ C. and preferably at temperatures of about $-100°$ C., by contact with solutions of Friedel Crafts type catalysts in low freezing solvents such as lower alkyl halides and in the presence of suitable diluents. The polymer is ordinarily formed as a slurry in the diluent and unreacted olefinic materials and the separation of the polymer from the reaction liquid has presented a number of problems. Dumping of the slurry of polymer in reaction liquid into heated water gives a readily handled slurry of polymer in water and vaporizes the unreacted materials, diluents, etc. Since the maximum slurry concentration that may be handled in pumps, pipes and the like is about 20% and the ordinary safe limit is usually somewhat less, large volumes of reactants and diluents are volatilized in this procedure and for economical operation, must be compressed, reliquefied and purified for reuse in the process. This requires a considerable amount of compressing, fractionating and refrigerating equipment and at the same time involves considerable cost to operate this equipment. In order to avoid the vaporization and consequent recovery and refrigeration of these volatile materials, it has been proposed to subject the slurry of polymer in cold reaction liquid to a screen operation to separate solid polymer particles from the catalyst solvent, diluents and unreacted materials which may then be directly recycled to the reactor. This process has not been found to be entirely satisfactory because of the difficulty encountered in controlling the process to form the polymer in a substantially granular form which is desirable for filtration and the difficulty caused by plugging of the screening element.

It is the object of this invention to provide a means for effecting removal of polymer particles from cold reaction liquids.

It is also the object of this invention to provide means for effecting removal of polymer particles from cold reaction liquids that is not affected by variations in tackiness of the polymer particles.

It is a further object of this invention to provide a means for removing polymer particles from cold reaction liquids that is not dependent upon the formation of substantially granular polymer particles.

It is also an object of this invention to provide a means for removing polymer particles from cold reaction liquids that is not subject to plugging of the separatory surface.

It is a further object of this invention to provide a means for effecting a complete separation of the polymer particles from the reaction liquid and recovery of the polymer in a continuous manner.

These and other objects will appear more clearly from the detailed specification and claim which follow.

It has been found that high molecular weight isoolefin polymers can be separated from slurries thereof in cold reaction liquids by subjecting the same to the action of an electric field of sufficiently high potential. For example, the slurry of polymer in cold reaction liquid may be supplied at the top of a rotating drum, the lower portion of the drum being surrounded by a grid which is concentric with the drum and spaced a distance of six inches from it. By providing electrical discharge points on the grid on approximately six inch centers and maintaining an unidirectional electrical potential of 50,000 to 100,000 volts between the grid and the drum, the polymer particles became deposited from the slurry onto the drum, allowing the reaction liquid to drip off continuously. Should some liquid be included with the polymer, it is possible to either wash this material out with a spray or remove it by use of a squeeze roll or any other suitable means, whereupon the separated polymer can be removed from the drum as by means of a doctor blade. It is also within the scope of this invention to utilize similar electrical means to keep reactor surfaces or any other equipment coming in contact with polymer slurries, free from deposited polymer by arranging a grid with suitable discharge points for charging the polymer particles and making the surface that is to be kept free from deposited polymer of the same polarity as the grid in order that the said surface will repel the polymer particle.

A suitable form of apparatus for carrying out the present invention is illustrated in the accompanying drawing in which the single figure is a cross-sectional view of a separator in accordance with this invention.

The drawing represents a schematic view in which there is shown line 10 through which the slurry to be separated into precipitated polymer and carrying liquid is admitted to the apparatus. The slurry may be at any convenient temperature but it is preferably at or near the temperature of reaction. This material, after leaving line 10, is distributed by device 12 across the face of drum 14 which is rotated in a clockwise direction. The slurry is allowed to run down the face of the drum and in passage across the face of the drum is subjected to an electrical discharge potential. Electrical potential for supplying the electrostatic field is provided by wires 16 and 18 which are connected to a suitable source of electrical energy. This may consist of A. C. of any convenient voltage, a transformer for bringing the current up to the necessary or desired voltage and a suitable rectifier. The rectifier may be of the tube type or it may be a mechanical converter which merely reverses the negative half of the impressed sine wave and does not possess any means for leveling off the peaks and the valleys thereby giving unidirectional voltage which is pulsating in character. The wires 16 and 18 lead through insulators 20 and 22 and are connected to electrode 24 which comprises a large number of discharge points and the drum 14 at some convenient point such as the axle 26. Discharge electrode 24 may be at a distance of 1″ to 6″ or even more from the surface of the drum 14, the distance from the drum depending upon the potential supplied. Normally the voltage required will be between 75,000 and 90,000, and the distance between the drum and the discharge electrode will be between 3″ and 5″. As the liquid fed through distributing device 12 flows across the surface of drum 14 the electrical discharge described above causes the polymer particles to take the charge of the points on electrode 24 and to adhere firmly to the surface of the drum 14 carrying the opposite charge and allows the liquid to run off the drum 14, and it will be collected in the bottom of vessel 28 which can be used to surround the entire apparatus. If found desirable, the reaction zone may also be included in vessel 28. The clear liquid separated from the polymer is allowed to flow out of the vessel 28 through line 30 and may be reused in the polymer process without further treatment. The polymer precipitated on the surface of the drum may be scraped off from the drum by the knife 32, and will fall into spout 34 and be removed from the vessel through conduit 36. Instead of the knife 32 any other suitable means such as an air blast, picker roller or the like may be used to remove the polymer from drum 14. If found desirable the polymer may be washed by a liquid injected into the vessel by line 38 and sprayed on the polymer adhering to the drum through nozzle 40. This washing liquid may be any suitable material such as fresh solution which is added to the system as make-up from time to time. The wash solution injected through nozzle 40 may, of course, be kept separate from the clarified solution leaving the vessel through line 30. In normal operation the capacity of the separator may be in the neighborhood of 1 to 5 gallons of clarified liquid per square foot per hour for essentially complete removal of polymer. However, if incomplete removal can be tolerated, rates many-fold of those indicated above may be used. It is obvious that complete clean-up of polymer from the recycle liquid is not essential in a process of this sort and hence high rates may be used in the apparatus described.

The present invention is applicable to the preparation of any solid, high molecular weight low temperature polymerization products from isoolefinic hydrocarbons or from mixtures of isoolefinic hydrocarbons with vinyl aromatic compounds or with diolefinic compounds capable of copolymerizating with isoolefinic compounds at low temperatures in the presence of Friedel-Crafts type catalysts. The preferred isoolefinic is isobutylene but other isoelefins containing up to about 8 carbon atoms per molecule, such as 2-methyl- or 2-ethyl butene-1. The copolymerizable materials which may be polymerized in admixture with the isoolefins include vinyl aromatic compounds, such as styrene, alpha methyl styrene, para methyl styrene, alpha methyl para methyl styrene and diolefinic materials, such as butadiene and substituted butadienes, particularly isoprene, piperylene, dimethyl - butadiene, methyl pentadiene. Other polyolefinic materials containing up to 12 or 14 carbon atoms per molecule, such as myrcene and certain non-conjugated diolefins, such as dimethylallene and the like are also useful. In the preparation of isoolefin polymers of high molecular weight, it is preferable, as is well known, to use isoolefins of very high purity. In forming copolymers of isoolefins with vinyl aromatic compounds, it is preferable to use from about 35 to about 99 weight per cent of isoolefin with from about 65 to about 1 weight per cent of vinyl aromatic. In the formation of isoolefin-diolefin copolymers, the ratio of isoolefin to diolefin in the reaction liquid is from about 50-99 weight per cent of isoolefin to about 50 to 1 weight per cent of diolefin when the latter is a C₄ diolefin. With C₅ and higher diolefins, the amount of diolefin is less than 10 weight per cent and preferably less than 5 weight per cent.

The catalyst used may be boron fluoride, preferably in solution, or it may be a solution of a conventional Friedel-Crafts type catalyst, such as aluminum chloride or the other materials listed on page 375 of the article on "Friedel-Crafts synthesis" by N. O. Calloway, published in "Chemical Reviews," volume 17, No. 3, in 1935. For catalyst solvent, there may be used a mono- or polyhalogenated aliphatic compound, carbon disulfide and the like. Diluents that may be used in the process include the alkyl halides, preferably methyl or ethyl chloride, as well as hydrocarbons containing less than about 5 carbon atoms per molecule such as methane, ethane or ethylene. The catalyst solvents and diluents should be materials which do not form complexes with Friedel-Crafts type catalysts and which are liquid at the reaction temperatures.

There are certain conditions under which the polymer slurries tend to become unstable and such conditions are preferably avoided in order to achieve the best results in the separation of the polymer in accordance with the present invention. Instability of the slurry leading to agglomeration of the polymer in the polymer slurry is favored by higher temperatures, lower molecular weight of the polymer, the use of diluents which tend to be mutually soluble with the polymer under the operating conditions, the use of larger proportions of hydrocarbon reagents which are also mutually soluble with the polymer, as well as excessive degree of dispersion of the catalyst.

Stable slurries of polyisobutylene can be produced at −90° C. with methyl chloride-isobutylene feeds by maintaining a volume ratio of methyl chloride to isobutylene greater than about 0.7:1 in the reaction mixture, with good agitation throughout the slurry. At higher temperatures, higher diluent rations are required up to temperatures of about −50° C., which is the approximate limit for the formation of high molecular weight polymer slurries. This temperature effect on molecular weight has been described by Thomas, Sparks, Frolich, Otto and Mueller-Cunradi in the Journal of the American Chemical Society, vol. 62, page 276 (1940). As is also indicated in that article, impurities in the reaction mixture tend to lower the molecular weight of the polymer formed and the lower the molecular weight of the polymer, the higher the diluent ratio required to form a satisfactory slurry.

The same general principles apply to the production of low temperature isoolefin-diolefin copolymerizate slurries. The molecular weights of these copolymers, as determined by the Staudinger method, are considerably lower than the molecular weights of polybutenes prepared under otherwise similar conditions. This effect is attributable to the presence of diolefin in the reaction mixture. At −90° C. diluent ratios above 1:1 and preferably over 2:1 should obtain in the reaction zone. In the manufacture of these copolymers, the reaction temperature should not exceed about −70° C. Low temperature isoolefin-diolefin copolymers of normal molecular weight for use as natural rubber substitutes, i. e., having Staudinger molecular weights of about 30,000 and above, can be maintained as a slurry, provided that the per cent hydrocarbon or other mutual solvent is not too high. Thus, when the reaction liquid contains 60–90 weight per cent of methyl chloride, the slurries containing polymer averaging over roughly 30,000 molecular weight are easily maintained, but if the percentage of methyl chloride is reduced to about 30%, the slurry becomes unstable and the polymer particles tend to agglomerate. With increasing diolefin content of the isoolefin-diolefin feed, the molecular weight of the resultant copolymer is lowered and the temperature necessary for the maintenance of a stable slurry is lowered. Increasing the methyl chloride diluent ratio will also compensate, to a limited extent, for lower molecular weight of polymer, thereby permitting maintenance of slurry formation. When using aluminum chloride-methyl chloride catalyst solutions, the concentration of aluminum chloride may be up to about 1 gram per 100 cc.

The foregoing description contains a limited number of embodiments of the present invention, but it will be understood that numerous variations are possible without departing from the scope of the present invention as defined by the following claim.

What I claim and desire to secure by Letters Patent is:

In a process for producing high molecular weight rubbery polymers of at least 30,000 Staudinger molecular weight and which are normally tacky at room temperature, by copolymerizing a mixture comprising about 90 to 99% by weight of isobutylene and about 1 to 10% by weight of isoprene at a temperature between −70° C. and −100° C., in the presence of 60 to 90%, based on the weight of total reaction liquid, of methyl chloride, and in the presence of a dissolved Friedel-Crafts catalyst, in a polymerization zone to form a stable slurry of insoluble solid polymer particles suspended in methyl chloride, the improvement which comprises withdrawing at least a portion of said slurry from said polymerization zone, subjecting the withdrawn slurry to the action of a unidirectional electric field having a potential between about 50,000 and 100,000 volts, to effect a separation of the solid polymer particles from the methyl chloride, at a temperature of about −70° C. to −100° C., whereby any substantial vaporization of the normally gaseous methyl chloride is prevented, the normally tacky polymer particles are kept in a non-tacky, non-agglomerating granular form, and solution of the polymer in the methyl chloride is prevented, recovering the separated polymer particles from the cold liquid methyl chloride, and recycling at least a portion of said cold liquid methyl chloride from which solid particles have been removed, to the polymerization zone.

CHARLES W. TYSON.

REFERENCES CITED

The following references are of record in the file of this patent:

UNITED STATES PATENTS

| Number | Name | Date |
|---|---|---|
| 2,054,075 | Fisher | Sept. 15, 1936 |
| 2,109,130 | Fisher | Feb. 22, 1938 |
| 2,141,177 | Seto et al. | Feb. 14, 1939 |
| 2,292,608 | Buckman et al. | Aug. 11, 1942 |
| 2,300,283 | Fisher | Oct. 27, 1942 |
| 2,372,575 | Hayward | Mar. 27, 1945 |
| 2,378,138 | Gaylor | June 12, 1945 |

FOREIGN PATENTS

| Number | Country | Date |
|---|---|---|
| 513,521 | Great Britain | Oct. 16, 1939 |